L. RINGER.
SIGNAL SYSTEM FOR MOVING VEHICLES.
APPLICATION FILED MAR. 6, 1917.
1,305,936.
Patented June 3, 1919.
3 SHEETS—SHEET 2.
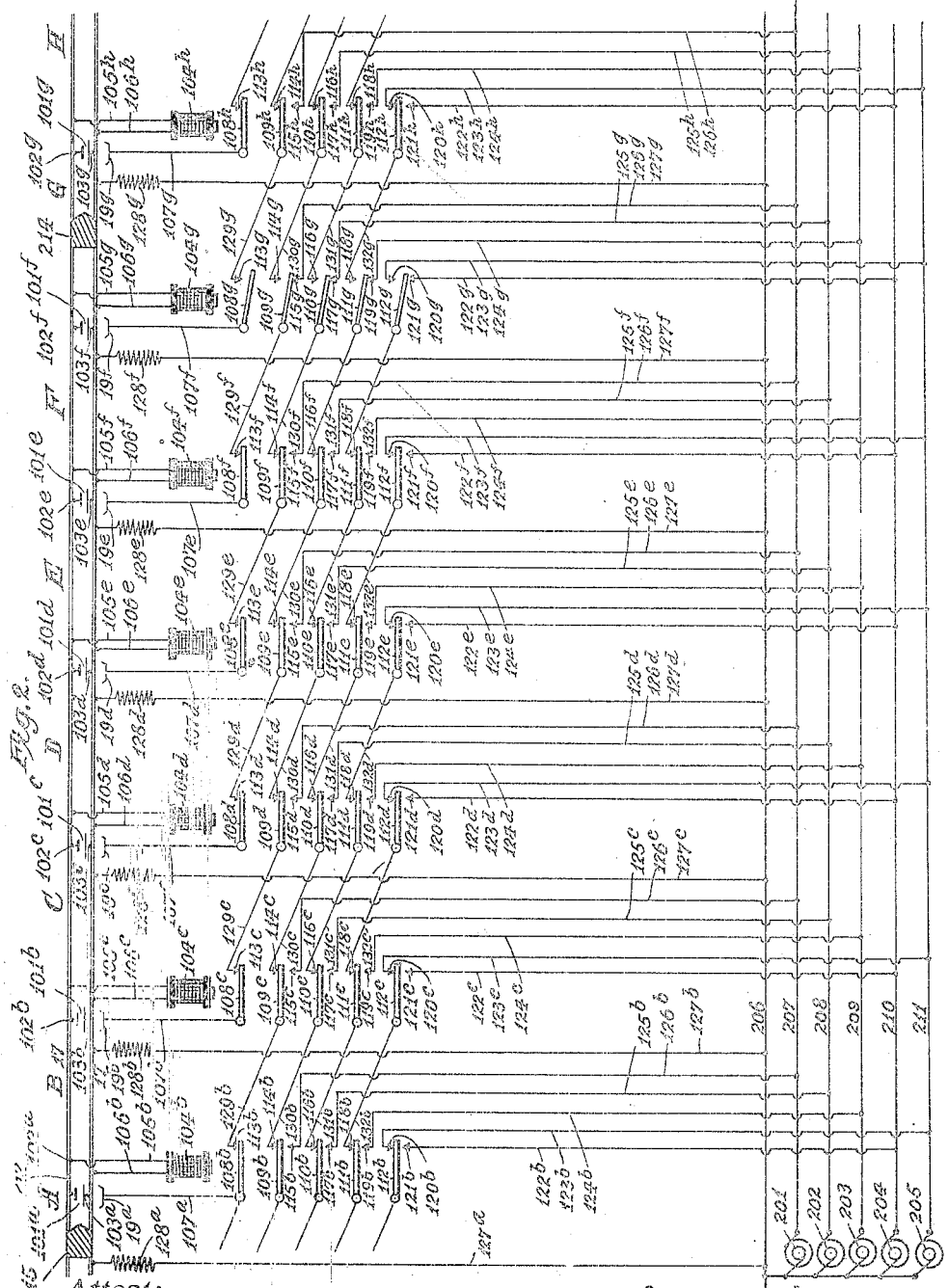
Attest:
Luther Ringer Inventor:
by William R. Baird
his Atty

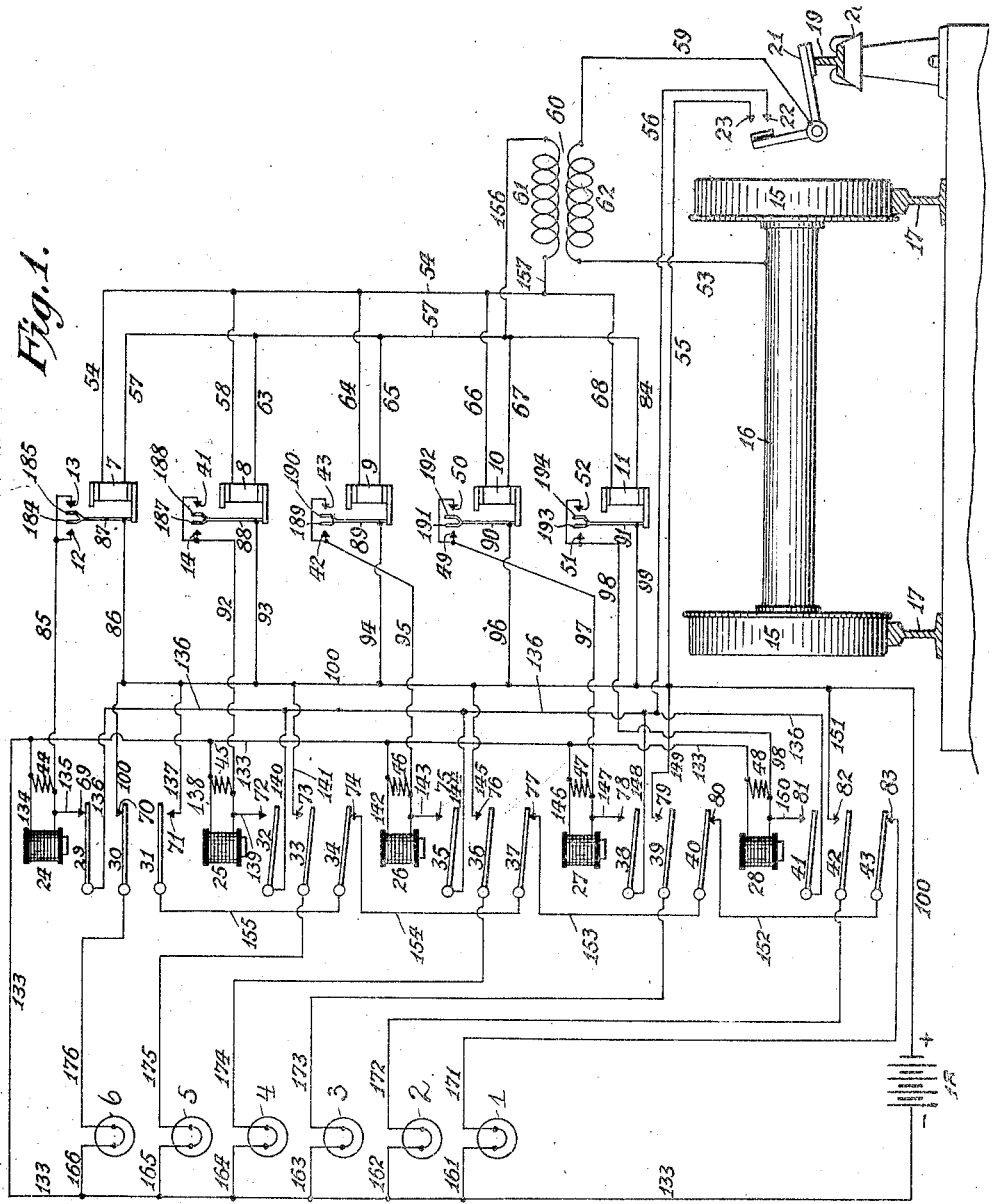

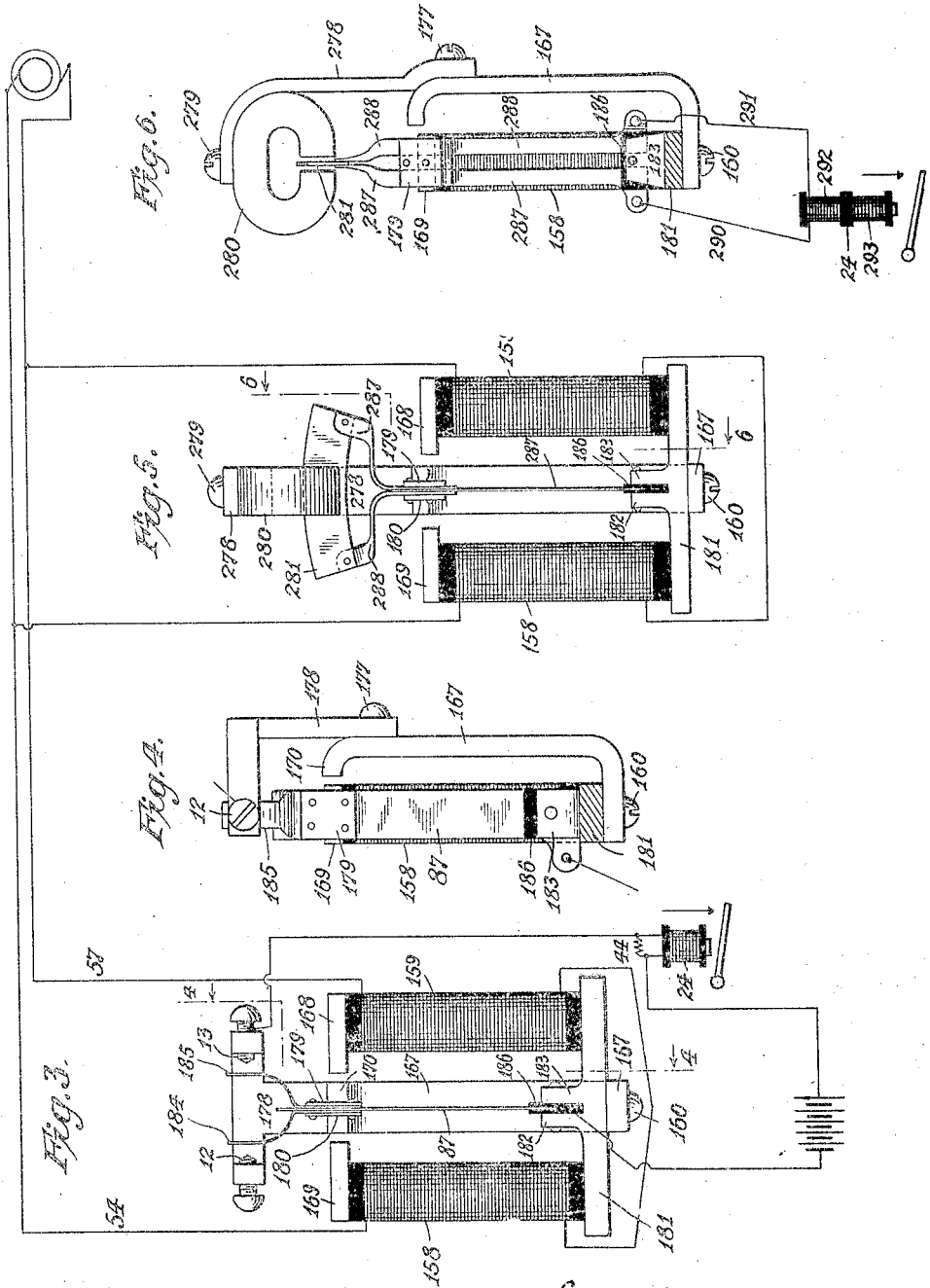

UNITED STATES PATENT OFFICE.

LUTHER RINGER, OF BUFFALO, NEW YORK, ASSIGNOR TO THE SIMMEN AUTOMATIC RAILWAY SIGNAL COMPANY, OF BUFFALO, NEW YORK, A CORPORATION OF ARIZONA.

SIGNAL SYSTEM FOR MOVING VEHICLES.

1,305,936.      Specification of Letters Patent.      Patented June 3, 1919.

Application filed March 6, 1917. Serial No. 152,524.

*To all whom it may concern:*

Be it known that I, LUTHER RINGER, a citizen of the United States, residing at Buffalo, in the county of Erie and State of New York, have invented certain new and useful Improvements in Signal Systems for Moving Vehicles, of which the following is a specification.

This invention relates to a system of signals for moving vehicles adapted to advise the operator of the vehicle of the conditions of safety or danger along the route over which the vehicle is traveling, or other conditions which it may be desirable or convenient for him to know, and particularly to such a system in which a plurality of signal indications are carried on the vehicle.

There is already known in the art a vehicle signal system which comprises three signals on the vehicle actuated through the medium of an intermittently acting device external to the vehicle, and which is electrical in character and is capable of being energized in either of two directions or deenergized. There is also known in the art a vehicle signal system, together with a cooperating speed control system in which four indications are obtained on the vehicle by the use of three contact shoes carried thereon and adapted to coöperate with three signal rails arranged at different lateral distances from the running rails and with appropriate electrical connections.

The subject matter of this application is specifically to provide for a plurality of more than three indications in the cab which are obtained by the use of a single contact shoe and signal rail and appropriate electrical connections, and by the use of a plurality of alternating current generators of different frequencies outside the vehicle for actuating the devices carried by the vehicle. These devices on the vehicle include relays of the harmonic type, one relay being provided to correspond to each alternating current generator used. For the purpose of clearness in the description, there is illustrated in the accompanying drawing and described in the text, five harmonic relays on the vehicle together with coöperating devices to control six signals on the vehicle, but obviously the number of relays and signals may be varied without departing from the principles of the invention described.

In the following description there is shown a track controlled system for the vehicle signals based on direct current continuous track circuits which are well known in the art. The devices shown however may be controlled in this manner or by alternating current track circuits or by the mechanism of an interlocking plant or by a remote central controlled system or by any other method desired or available without departing from the principle of this invention.

In the drawings there is illustrated a preferred form of apparatus embodying my invention, the parts being shown largely in diagram for the purpose of promoting clearness in the description, and the position of the parts on the vehicle being that assumed when a clear signal has been indicated.

In the drawings, Figure 1 is a diagrammatic view of the devices on the vehicle, the signal rail being shown in section; Fig. 2 is a diagram of a trackway divided into six blocks, portions of two other blocks being shown; Fig. 3 is an enlarged detail front view of the harmonic relay shown in Fig. 1; and Fig. 4 is a side view thereof. Fig. 5 is a front view of a modified form of such relay. Fig. 6 is a section on the plane of the line 6—6 in Fig. 5.

The track equipment is as follows: 17, 17 indicate track rails along which the vehicle is adapted to travel and which rails are divided by insulated joints 212 into blocks designated by the letters A, B, C, D, E, F, G and H. The equipment of all the blocks is identical and the corresponding devices in each block are designated by the same numbers with the lower case letters of the alphabet following each number to designate the particular block referred to. The devices in block C will be described and it will be understood that the devices in the other blocks are the same. At one end of the block is a track battery 101$c$, which is connected to the rails by the wires 102$c$ and 103$c$. At the other end of the block is a track relay 104$c$, connected to the rails by the wires 105$c$ and 106$c$. The relay 104$c$ has five neutral armatures 108$c$, 109$c$, 110$c$, 111$c$ and 112$c$, adapted, when the relay is energized, to touch contacts 113$c$, 114$c$, 116$c$, 118$c$ and 120$c$ respectively. When the relay 104$c$ is deënergized, the armatures 109$c$ and 110$c$, 111$c$ and 112$c$ are adapted to touch contacts 115$c$, 117$c$, 119$c$ and 121$c$ respectively. At the exit end of the block C, that is, at the entrance to the block D, there is provided a signal rail 19c, which is connected by wire 107c with the armature 108d. Line wires 206, 207, 208, 209, 210 and 211 are provided along the trackway. Wire 206 is a common return wire and is connected to one track rail of each block by means of a wire and resistance coil, such as are seen at 127c and 128c. The purpose of the resistance coil 128c is to prevent current from the track battery of one block flowing in another block. 201, 202, 203, 204, and 205 are alternating current generators of substantially different frequencies, one terminal of each of these generators being connected to the wires 207, 208, 209, 210 and 211 respectively; the other terminal of all of these generators being connected to the common return wire 206. The various line wires, track relays and signal rails are connected by other electrical conductors or wires, which will be more fully described in the electrical circuits hereinafter set forth.

The car equipment is shown in Fig. 1, in which 17, 17 indicate the track rails, 15, 15 the wheels of the vehicle, and 16 its axle. A shoe 21 is hingedly mounted at a convenient place on the vehicle and adapted to contact with the signal rail 19, and during this contact, the shoe breaks contact with points 22, 23, connected up to wires 55 and 56 as hereinafter described. After leaving the signal rail, the shoe is restored by gravity or spring pressure to contact with such points. Also mounted on the vehicle, is a transformer 60 having a primary coil 62 and a secondary coil 61. The primary coil 62 has a terminal connected by a wire 59 with the shoe 21, and the other terminal connected by a wire 53 to the axle 16. The secondary coil 61 has one terminal connected by a wire 156 to a wire 57 and the other terminal connected by a wire 157 to a wire 54. Harmonic relays indicated by 7, 8, 9, 10 and 11 are connected in multiple with the wires 54 and 57 and will be hereinafter described in detail. There are five direct current relays 24, 25, 26, 27 and 28 provided on the vehicle. The relay 24 has three neutral armatures, 29, 30 and 31, and when the relay is energized, the armatures 29 and 30 touch contacts 69 and 70 respectively, and when it is deënergized the armature 31 touches a contact 71. The relay 25 has three neutral armatures 32, 33 and 34 and when it is energized the armatures 32 and 33 touch contacts 72 and 73 respectively and when it is deënergized the armature 34 touches the contact 74. The relay 26 has three neutral armatures 35, 36 and 37, and when it is energized, the armatures 35 and 36 touch contacts 75 and 76 respectively, and when it is deënergized, the armature 37 touches a contact 77. The relay 27 has three neutral armatures 38, 39 and 40 and when it is energized, the armatures 38 and 39 touch contacts 78 and 79 respectively and when it is deënergized the armature 40 touches a contact 80. The relay 28 has three neutral armatures 41, 42 and 43, and when it is energized the armatures 41 and 42 touch contacts 81 and 82 respectively, and when it is deënergized the armature 43 touches a contact 83. Comparatively high resistance non-inductive coils, which are connected in multiple circuit, with the relays 24, 25, 26, 27 and 28 respectively are designated 44, 45, 46, 47 and 48 and serve two purposes; first to prolong the period of energization of their corresponding relays by providing a path over which the inductive discharge may flow when the operative circuit of the relay is broken; and second to cut down arcing at the contacts which open and close the circuits of the relay. A source of electrical energy is mounted on the vehicle, and in this case is a local battery indicated at 18. 6 is a clear signal or green light, 1 is a danger signal or red light, and 2, 3, 4 and 5 are signals for indicating the numbers of clear blocks ahead of a train or other conditions and may be distinguished by providing them with ground glass inclosures which have the desired indications displayed upon their faces. The described parts are connected together by electrical conductors which will be more specifically referred to in the descriptions of the circuits hereinafter set forth.

The harmonic relay shown in detail in Figs. 3 and 4, is described as follows. Coils 158 and 159 are suitably mounted on the upper parts of the U-shaped core 181, terminating in the upper pole faces 168 and 169. Mounted in lugs 182 and 183 which project upwardly from the central part of the base of the core and suitably insulated therefrom by insulating material 186 is a member 87 preferably made of sheet steel and capable of being vibrated; and rigidly attached to this, adjacent to the pole faces 168 and 169 are blocks of magnetic material 179 and 180. Attached to the upper end of the vibrating member 87 are contact springs 184 and 185 which are adapted, when the member 87 is vibrating, alternately to touch fixed but adjustable contact points 12 and 13. Rigidly attached to the bottom of the core 181 by suitable means, as a screw 160, is a permanent magnet 167 which has a pole face 170 adjacent to the back of the magnetic blocks 179 and 180. Rigidly attached to the back of the permanent magnet 167 by a screw 177 is an upwardly extending member 178 which supports the contact points 12 and 13.

The operation of the relay is as follows: Normally the permanent magnet 167 causes the entire core to be magnetized through the following magnetic circuit: from the pole face 170 through the permanent magnet 167, and thence through three paths, *a* through the left arm of the core 181 to the pole face 169; *b* through the right arm of the core 181 to the pole face 168; *c* through the vibrating member 87 to the magnetic blocks 179 and 180. When an alternating current is flowing in the coils 158 and 159, the magnetic flux of the core 181 and therefore the pole faces 168 and 169 is alternately reversed. Due to the influence of the permanent magnet 167 the magnetic blocks 179 and 180 will still be magnetized and will be alternately attracted and repelled by the pole faces 168 and 169, causing the member 87 to vibrate and the contact springs 184 and 185 to touch the points 12 and 13 respectively. This only occurs however when the frequency of the alternating current flowing in the coils 158 and 159 is such that it corresponds to the natural period of vibration of the member 87, which period may be varied in the different harmonic relays by varying the thickness of steel used or by varying the weight of the magnetic blocks 179 and 180, or both.

The relays 7, 8, 9, 10 and 11 are all similar, but are constructed so that each respond to a substantially different frequency. For the purposes of this description, the relay 7 responds to the frequency of the generator 205, the relay 8 to that of the generator 204, the relay 9 to that of the generator 203, the relay 10 to that of the generator 202, and the relay 11 to that of the generator 201. The relay 8 has a vibrating member 88 carrying two contact springs 187 and 188 which are adapted when the member 88 is vibrating to touch fixed contacts 14 and 41 respectively; the relay 9 has a vibrating member 89 carrying two contact springs 189 and 190 similarly adapted to touch fixed contacts 42 and 43 respectively; the relay 10 has a vibrating member 90 carrying two similar springs 191 and 192 similarly adapted to touch fixed contacts 49 and 50 respectively; and the relay 11 has a vibrating member 91 carrying two contact springs 193 and 194 similarly adapted to touch fixed contacts 51 and 52 respectively.

In order clearly to describe the operation of the device, and the part played by the different circuits involved therein, we will first assume that a train or vehicle 214 is standing in block G and that another train or vehicle 215 is in block A and is approaching it. The track relay 104<sup>g</sup> will be de-energized due to the presence of the train 214 in its block, and the consequent short circuiting of the track battery. The relays 104*b*, 104*c*, 104*d*, 104*e*, and 104*f*, will not, however, be short circuited and will all be energized. When the vehicle 215 has moved far enough into the block A for its shoe 21 to contact with the signal rail 19*a*, a circuit will be closed from one terminal of the generator 205 to the wires 211, and 128*f*, contact 120*f*, armature 112*f*, wire 132*e*, contact 118*e*, armature 111*e*, wire 131*d*, contact 116*d*, armature 110*d*, wire 130*c*, contact 114*c*, armature 109*c*, wire 129*b*, contact 113*b*, armature 108*b*, wire 107*a*, signal rail 19*a*, shoe 21, wire 59, primary 62 of the transformer 60, wire 53, axle 16, wheels 15, rails 17, resistance 128*a*, wires 127*a* and 206 to the other terminal of the generator 205. The alternating current which thus flows in the primary coil 62 induces an alternating current in the secondary coil 61, thereby causing a current to flow in the coils of all the relays 7, 8, 9, 10 and 11, but the only relay which will vibrate when current of the frequency given out by the generator 205 flows through its coils is the relay 7, and such vibration of the member 87 of this relay causes the relay 24 to become energized through a circuit from the positive side of the vehicle battery 18 to the wires 100 and 86, member 87, contact springs 184 and 185, contacts 12 and 13, wire 85, relay coil 24, wires 134 and 133 to the negative side of the battery 18. When the relay 24 is energized, the clear signal lamp 6 will glow by reason of a circuit from the positive side of the battery 18 to the wire 100, contact 70, armature 30, wire 176, signal lamp 6 and wires 166 and 133 to the negative side of the battery 18.

After the vehicle 215 has moved far enough into the block A toward the block B to leave the signal rail 19*a*, its shoe 21 drops and makes contact with the terminals 22 and 23, causing the relay 24 to be energized from the vehicle battery 18 through a circuit to the wires 100 and 55, contact 23, shoe 21, contact 22, wires 56 and 136, armature 29, contact 69, wire 135, relay coil 24 and wires 134 and 133 to the negative side of the battery, which circuit will cause the signal lamps 6 to continue to burn as heretofore explained.

Let us now assume that the vehicle 214 is still standing in the block G and the train 215 has moved far enough into the block B for its shoe 21 to contact with the signal rail 19*b*. A current will then flow from one terminal of the generator 204 to the wires 210 and 122*g*, contact 121*g*, armature 112*g*, wire 132*f*, contact 118*f*, armature 111*f*, wire 131*e*, contact 116*e*, armature 110*e*, wire 130*d*, contact 114*d*, armature 109*d*, wire 129*c*, contact 113*c*, armature 108*c*, wire 107*b*, signal rail 19*b*, shoe 21, wire 59, primary 62 of the transformer 60, wire 53, axle 16, wheels 15, rails 17, resistance 128*b*, and wires 127*b* and 206 to the other terminal of the generator 204. The current flowing in the primary coil 62 will induce an alternating current in the secondary coil 61 of the same transformer, causing current to flow in all the relays 7, 8, 9, 10 and 11, but which however will only affect the relay 8 because of the frequency of the current of the generator 204 and this will cause the member 88 of such relay to vibrate, which in turn will cause the relay 25 to be energized through a circuit from the positive side of the vehicle battery 18 to the wires 100 and 93, the member 88, contact springs 187 and 188, contacts 14 and 41, wire 92, relay 25, and wires 138 and 133 to the negative side of the battery 18. When the relay 25 is energized, the signal lamp 5 will be caused to glow through a circuit from the positive side of the battery 18 to the wires 100 and 141, contact 73, armature 33, wire 175, signal lamp 5, wire 165 and wire 133 to the negative side of the battery. After the train 215 has moved so that the shoe 21 will leave the signal rail 19b, it will make contact with the terminals 22 and 23 and cause the relay 25 to remain energized through a circuit from the positive side of the battery 18 to the wires 100 and 55, contact 23, shoe 21, contact 22, wires 56, 136, and 140, armature 32, contact 72, wire 139, relay 25, and wires 138 and 133 to the negative side of the battery 18 causing the signal lamp 5 to continue to burn.

Let us assume that the train 214 yet remains in the block G and the train 215 has advanced into the block C so that its shoe 21 will contact with its signal rail 19c. Current will then flow through the following circuit: from one terminal of the generator 203 to the wires 209 and 124g, contact 119g, armature 111g, wire 131f, contact 116f, armature 110f, wire 130e, contact 114e, armature 109e, wire 129d, contact 113d, armature 108d, wire 107c, signal rail 19c, shoe 21, wire 59, primary 62 of the transformer 60, wire 53, axle 16, wheels 15, rails 17, resistance 128c, wires 127c and 206 to the other terminal of the generator 203. The alternating current flowing in the primary 62 of the transformer 60 will induce an alternating current in the secondary 61 of the transformer, and will cause current to flow in the coils of all the relays 7, 8, 9, 10 and 11; but as only the relay 9 will respond to the frequency of the current produced by the generator 203, the vibrating member 89 of such relay alone will vibrate. This will cause the relay 26 to become energized through a circuit from the positive side of the battery 18 to the wires 100 and 94, member 89, contact springs 189 and 190, contacts 42 and 43, wire 95, relay 26 and wires 142 and 133 to the negative side of the battery 18, which will cause the signal lamp 4 to glow through a circuit from the positive side of the train battery 18, to the wires 100 and 145, contact 76, armature 36, wire 174, signal lamp 4, and wire 164 and wire 133 to the negative side of the battery 18.

After leaving the signal rail 19c, the shoe 21 will be restored into contact with the contact points 22 and 23, and the relay 26 will remain energized through a circuit from the positive side of the battery 18 to the wires 100 and 55, contact 23, shoe 21, contact 22, wires 56 and 136, wire 144, armature 35, contact 75, wire 143, relay 26 and wires 142 and 133 to the negative side of the battery 18. Thus it is seen that the signal lamp 4 will continue to burn after leaving the signal rail 19c.

Let us now assume that the train 214 is still standing in the block G and that the train 215 has advanced far enough into block D for its shoe 21 to contact with the signal rail 19d. Current will then flow through a circuit from one terminal of the generator 202 to the wires 208 and 125g, contact 117g, armature 110g, wire 130f, contact 114f, armature 109f, wire 129e, contact 113e, armature 108e, wire 107d, signal rail 19d, shoe 21, wire 59, primary 62 of the transformer 60, wire 53, axle 16, wheels 15, rails 17, resistance 128d, and wires 127d and 206 to the other terminal of the generator 202. The alternating current flowing in the primary 62 of the transformer 60 will induce an alternating current in the secondary 61 of the transformer, and this will cause current to flow in the coils of all the relays 7, 8, 9, 10 and 11, but, as only the relay 10 responds to the frequency of current generated by the generator 202, the member 90 of this relay alone will vibrate, and this will cause the relay 27 to become energized through a circuit from the positive side of the train battery 18 to the wires 100 and 96, member 90, contact springs 191 and 192, contacts 49 and 50, wire 97, relay 27 and wires 146 and 133 to the negative side of the battery 18. When the relay 27 is energized, the signal lamp 3 glows through a circuit from the positive side of the battery 18, to the wires 100 and 149, contact 79, armature 39, wire 173, signal lamp 3 and wires 163 and 133 to the negative side of the battery 18.

After leaving the signal rail 19d, the shoe 21 is again lowered, touching the contacts 22 and 23 and the relay 27 remains energized through a circuit from the positive side of the train battery 18 to the wires 100 and 55, contact 23, shoe 21, contact 22, wires 56 and 136, and wire 148, armature 38, contact 78, wire 147, relay 27 and wire 146 and 133 to the negative side of the battery 18. It is thus seen that after leaving the signal rail 19d, the signal lamp 3 continues to burn.

Let us now assume that the train 214 is still in the block G, and that the train 215 has moved far enough into the block E for its shoe 21 to contact with the signal rail 19e; current then flows through a circuit from one terminal of the generator 201 to the wires 207 and 126g, contact 115g, armature 109g, wire 129f, contact 113f, armature 108f, wire 107e, signal rail 19e, shoe 21, wire 59, primary 62 of transformer 60, wire 53, axle 16, wheels 15, rails 17, resistance 128e and wires 127e and 206 to the other terminal of the generator 201. The alternating current which is now flowing in the primary 62 of the transformer 60 induces an alternating current in the secondary 61 of the said transformer, thus causing current to flow in all the relays 7, 8, 9, 10 and 11, but, as only the relay 11 responds to alternating current of the frequency generated by the generator 201, the member 91 of the relay 11 alone will vibrate, and this will cause the relay 28 to become energized through a circuit from the positive side of the battery 18 to the wires 100 and 99, member 91, contact springs 193 and 194, contacts 51 and 52, wire 98, relay 28 and wire 133 to the negative side of the battery 18. When the relay 28 is energized the signal lamp 2 glows through a circuit from the positive side of the battery 18 to the wires 100 and 151, contact 82, armature 42, wire 172, signal lamp 2, wire 162, wire 133 to the negative side of the battery 18.

After leaving the signal rail 19e, the shoe 21 is lowered to touch the contacts 22 and 23 and the relay 28 remains energized through a circuit from the positive side of the battery 18 to the wires 100 and 55, contact 23, shoe 21, contact 22, wires 56 and 136, armature 41, contact 81, wire 150, relay 28 and wire 133 to the negative side of the battery 18. It is thus seen that after leaving the signal rail 19e, the signal lamp 2 will continue to burn.

Let us now assume that the train 214 is still in the block G and that the train 215 has moved far enough into the block F to bring its shoe 21 into contact with signal rail 19f. None of the relays 7, 8, 9, 10 and 11 can now become energized, as the outside circuit is broken at the armature 108g. All of the relays 24, 25, 26, 27 and 28 will become deënergized as their holding circuits are broken due to the raising of the shoe 21 by the signal rail 19f and the consequent breaking of its contact with the contact points 22 and 23. When the relays 24, 25, 26, 27 and 28 are deënergized, the danger signal lamp 1 glows through a circuit from the positive side of the battery 18 to the wires 100 and 137, contact 71, armature 31, wire 155, armature 34, contact 74, wire 154, armature 37, contact 77, wire 153, armature 40, contact 80, wire 152, armature 43, contact 83, wire 171, signal lamp 1, wire 161, and wire 133 to the negative side of the battery 18. Upon leaving the signal rail 19f, the danger signal 1 will continue to burn as all the relays 24, 25, 26, 27 and 28 will remain deënergized.

In Figs. 5 and 6 there is shown a modified form of the vibrating relay. In these two views the parts which are numbered the same as the parts in Figs. 3 and 4 are identical in construction and function, but instead of the single vibrating member shown in the prior construction, there is shown in this modified form two vibrating members 287 and 288, which are mounted on lugs 182 and 183 and which members are insulated from each other. The upper ends of these members are rigidly attached to a current conducting vane 281, the member 287 being attached to the right end and the member 288 to the left end thereof. The vane 281 is mounted so that it is free to vibrate in a slot of a permanent magnet 280 which is attached to a bracket 278 by a screw 279, the bracket being attached to the permanent magnet 167 by the screw 177. As the members 287 and 288 are mechanically connected at three points, viz., at the lugs 182 and 183, at the magnetic blocks 179 and 180, and at the vane 281, it is evident that a vibrating member is thus formed whose vibrations cause the vane 281 to be moved rapidly to and fro in the field of the magnet 280. When this vibration is taking place, an alternating current will be set up in the vane 281 which will be collected by the members 287 and 288, which members are attached by wires 290 and 291 to a coil 292 which responds to such alternating current. This coil is part of a modified relay 24 comprising two coils 292 and 293, the coil 292 acting as the operating coil of the relay, responsive to an alternating current, and the coil 293 acting as a holding coil of the relay, responsive to a direct current. It will therefore be obvious that the modified construction of relay could be substituted for the device originally described without altering the general mode of operation of the apparatus.

I claim:—

1. The combination with a trackway, of a vehicle adapted to travel thereon, more than three signals carried on the vehicle, a series of signal rails arranged along the trackway, means including a contact shoe for electrically energizing the signal rails in different ways, comprising alternating current generators of substantially different frequencies, and means for independently operating the signals corresponding to the different ways in which the signal rails have been energized, a danger signal on the vehicle and means controlled by the contact shoe for energizing the danger signal when the vehicle passes a deënergized rail.

2. The combination with a trackway, of a vehicle adapted to move thereon, more than three signals carried on the vehicle, a series of signal rails arranged along the trackway, means for electrically energizing the signal rails in different ways, comprising alternating current generators of substantially different frequencies, and means for independently operating the signals corresponding to the different ways in which the signal rails have been energized, including a shoe carried by the vehicle and adapted to contact with each signal rail as the vehicle passes the same, a danger signal on the vehicle and means controlled by the contact shoe for energizing the danger signal when the vehicle passes a deënergized rail.

3. In combination, a railway, a train adapted to be moved thereon, more than three signals on the train, a series of signal rails arranged along the railway, alternating current generators of substantially different frequencies for energizing the signal rails, means for independently operating the signals corresponding to the different kinds of current supplied thereto, including a single shoe carried by the vehicle and adapted to contact with the signal rails in succession, and means on the vehicle for automatically maintaining any particular signal in operation after such shoe has ceased to contact with the particular signal rail from which said signal received the current by which it was originally actuated, a danger signal on the vehicle and means controlled by the contact shoe for energizing the danger signal when the vehicle passes a deënergized rail.

4. The combination with a trackway, of a vehicle adapted to travel thereon, more than three signals carried on the vehicle, a series of signal rails arranged along the trackway, means for electrically energizing the signal rails in different ways comprising alternating current generators of substantially different frequencies, means for deënergizing the rails and means for operating one signal of the series corresponding to the way in which the signal rail being passed has been energized, a danger signal on the vehicle and means controlled by the contact shoe for energizing the danger signal when the vehicle passes a deënergized rail.

5. The combination with a trackway, of a vehicle adapted to travel thereon, more than three signals carried on the vehicle, a series of signal rails arranged along the trackway, means for electrically energizing the signal rails in different ways comprising alternating current generators of substantially different frequencies, means for deënergizing the rails and means for operating one signal of the series corresponding to the way in which the signal rail being passed has been energized, said means including a shoe carried by the vehicle and adapted to contact with the signal rails and devices on the vehicle including a series of harmonic relays, a danger signal on the vehicle and means controlled by the contact shoe for energizing the danger signal when the vehicle passes a deënergized rail.

6. The combination with a trackway, of a vehicle adapted to travel thereon, more than three signals carried on the vehicle, a series of signal rails arranged along the trackway, means including a contact shoe for electrically energizing the signal rails in different ways comprising alternating current generators of substantially different frequencies, and means for independently operating the signals corresponding to the different ways in which the signal rails have been energized, including a series of harmonic relays on the vehicle each relay responding to an alternating current of one frequency only, and further means for maintaining any signal on the vehicle in operation after the electrical energization through the signal rail has ceased, a danger signal on the vehicle and means controlled by the contact shoe for energizing the danger signal when the vehicle passes a deënergized rail.

7. The combination with a trackway, of a vehicle, a plurality of signals thereon, a series of signal rails arranged along the trackway, alternating current generators of substantially different frequencies for energizing the signal rails, means for operating the signals corresponding to the different ways in which the rails are energized, and means for deënergizing the signal rails whereby through the same means a yet different signal is operated.

8. The combination with a railway, of a train, a plurality of signals on the train, signal rails arranged along the trackway, alternating current generators of substantially different frequencies for energizing the signal rails, means for operating the signals corresponding to the different ways in which the signal rails are energized, means for deënergizing the signal rails whereby a yet different signal is operated, and further means for maintaining any signal set in operation by the means mentioned until the signal operating means is acted upon through a signal rail in a different condition of energization.

In testimony whereof I affix my signature in presence of two witnesses.

LUTHER RINGER.

Witnesses:
C. E. CHATFIELD,
ANNA C. PERS.